Jan. 7, 1930.                J. C. ROSS                1,742,669
                            DUPLEX FAUCET
                          Filed Feb. 23, 1927
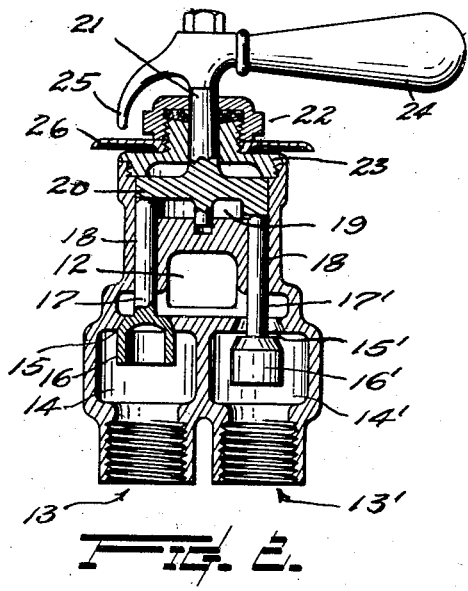
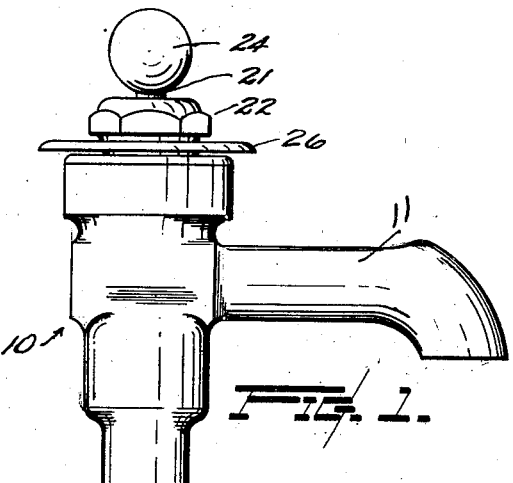
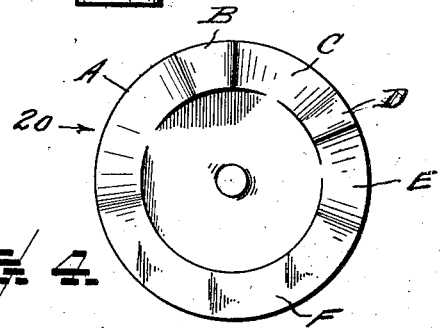
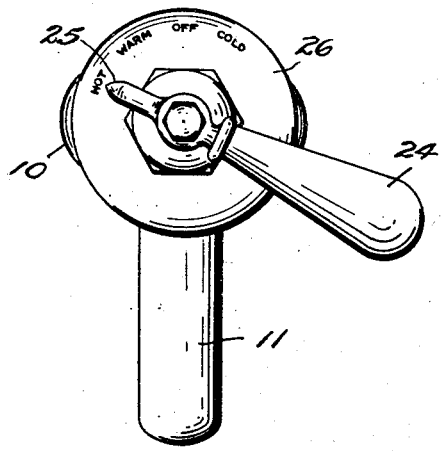
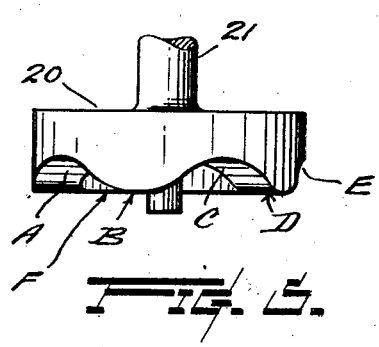
INVENTOR
James C. Ross
BY
Pierre Barnes
ATTORNEY Patented Jan. 7, 1930

1,742,669

UNITED STATES PATENT OFFICE

JAMES C. ROSS, OF SEATTLE, WASHINGTON

DUPLEX FAUCET

Application filed February 23, 1927. Serial No. 170,138.

This invention relates to a duplex faucet, that is, a faucet provided with two valves; and its object is to simplify and otherwise improve faucets of this character whereby either, or both of the valves, selectively, may be used individually or together, by means of a single operating device.

Briefly stated, my invention consists of a faucet having a single discharge opening and two inlets, which latter are adapted to be connected with hot and cold water service pipes, self-closing valves—of the type shown and described in U. S. Patent No. 1,563,589 dated December 11, 1925—for regulating the flow of water from the respective inlets to the outlet, and a manually operated cam device associated with the valves to effect a controlled delivery of water, as to quantity and temperature, from the faucet.

The invention further consists in the novel construction, adaptation and combination of parts hereinafter described and claimed.

In the accompanying drawing,—

Figure 1 is a side elevation of a duplex faucet embodying my invention; Fig. 2 is a longitudinal vertical section thereof; and Fig. 3 is a plan view of the same. Fig. 4 is an underside view of the cam which controls the faucet valves; and Fig. 5 is a side elevation of Fig. 4, part of the spindle being broken away.

In said drawing, the reference numeral 10 represents, generally, a faucet body having a spout 11 extending from a mixing chamber 12 (Fig. 2) at about the midheight of the body.

At the bottom of the body are two inlet openings 13 and $13^1$ adapted to be connected respectively with hot and cold water service pipes. (Not shown.)

Communication is had by means of valve chambers 14, $14^1$ and ports 15, $15^1$ between the respective inlets 13, $13^1$ and the mixing chamber 12. Said ports are in axial alignment with the respective inlets and are ground or otherwise formed to provide seats for valves 16 and $16^1$, one for each port. These valves are each substantially similar to the valve disclosed in the patent above referred to, that is to say, with a hollow cylindrical body portion or valve proper and a stem. These valve stems 17 and $17^1$ extend vertically through the mixing chamber 12 thereabove and thence through guideways 18 provided in the body into a cylindrical cam chamber 19.

Within the chamber 19 is a rotary cam 20 having rigid therewith a stem 21 which extends through a stuffing box 22 provided in a head 23 which is detachably connected to the faucet body and constitutes, in effect, a part of the latter.

24 represents a handle rigidly secured to the stem 21 for rotating the cam.

As shown, said cam is provided at its underside with a circular cam surface arranged to track upon the stems 17 and $17^1$ of the hot and cold water controlling valves 16 and $16^1$, respectively, for forcing the same downwardly from their seats, as may be desired, in opposition to the water pressure acting upwardly against the undersides of the valves to close the latter against their seats subject to the action of the cam 20.

The cam 20 is characterized by having a circular body with a depending peripheral rim or flange whose under surface is formed to provide downwardly directed hummocks, as B, D, and F alternating with recesses A, C and E. As shown in Fig. 4, the recesses A and E are at diametrically opposite sides of the cam, and the hummock F is of an arcuate length sufficient to have in diametrically opposed relation thereto a portion of the recess A, hummocks B, D and the recess C. By such an arrangement of cam surface elements, the cam when seated upon the floor of the chamber 19 and by being suitably rotated will be capable of depressing the stems of the valves—by means of the hummocks—to cause either or both of the valves selectively to be depressed into their open relation with respect to the valve seats, and cause either or both the valve stems to enter recesses of the cam to permit the valves to be moved by water pressure into closed relation.

By such devices, my duplex valve provides means operable by a single handle to control the delivery of water at various temperatures from hot and cold water service pipes.

More particularly, when the cam is brought into a rotary position whereat the cavities or recesses A and E are above the valve stems 17 and 17¹, respectively, both valves are held closed by the pressure of water; turning the cam from such assumed position in one rotary direction, until the hummock F is brought above the stem 17¹ and with the recess A still above the stem 17—a condition in which the cam is represented in Fig. 2—the hot water valve 16 remains closed and the cold water valve 16¹ is opened; but moving the cam in the opposite rotary position until the central portion of the recess C is above the stem 17¹ and the hummock F is above the stem 17, the valve 16¹ is closed and the valve 16 is open whereby hot water is delivered from the faucet.

To obtain delivery of warm water the cam is rotated to bring two hummocks, as D and F over both of the valve stems.

The action of the valves to afford full capacity flows and also for regulating them to shut off the water from either or both of the service pipes is effected as above explained and to regulate the valves to afford a smaller flow of water it is requisite only to rotatively position the cam to have the inclined surfaces, so to speak, of the hummocks brought into register with either or both of the valve stems.

As shown in Fig. 2, the underside of the body head 23 is formed to provide an annular shoulder which acts against the upper surface of the cam 20 to receive the thrust of the cam and maintain the latter in operable relation with respect to the stems of the valves.

To facilitate the positioning of the cam predeterminately, I provide a register consisting of a pointer element 25 on the handle to coact with indicating words—as "Hot", "Warm", "Off" and "Cold" (Fig. 3) on a dial plate 26 secured, preferably, against the head 23 as by means of the gland nut of the stuffing box, as shown.

The construction, operation and manner of using my invention will be understood from the foregoing specification.

What I claim, is:—

1. A duplex faucet comprising a body having a detachable head therefor, said body having a mixing chamber provided with a single delivery opening and two inlet openings, a valve for each of said inlet openings, said valves being arranged to close the respective openings by the pressure of the liquid, a stem for each of the valves, a water tight cam chamber, a rotary cam carried therein and retained by said head in operative engagement with both of the stems, said cam being adapted to be rotated for regulating the opening movements of either or both of said valves to predetermined extents, selectively, and means provided exteriorly of the body for controlling the action of said cam.

2. A duplex faucet comprising in combination, a body having a head detachably connected thereto, said body being provided interiorly with two chambers disposed one above the other, the lower of said chambers serving as a mixing chamber and being provided with a single liquid discharge opening and two liquid inlet openings, a valve for each of the inlet openings, said valves being arranged to close the respective inlet openings by the pressure of the liquid, stems rigid with the valves, stem guideways between the lower and the upper of said chambers, said valve stems extending therethrough and adapted to seal said upper chamber against the admission of water thereto, a rotary cam provided in the upper chamber and having a thrust bearing contact with said head, said cam being provided with a peripheral flange having a cam surface disposed circumferentially about its underside and in contactual relations with both of the valve stems, a stem rotatable with the cam and extending from said body, and an operating handle connected to the outer end of the last named stem for regulating the cam to effect the opening movements of either or both of the valves selectively.

Signed at Seattle, Washington, this 1st day of February, 1927.

JAMES C. ROSS.